United States Patent
Pettersson et al.

(10) Patent No.: US 7,405,356 B2
(45) Date of Patent: Jul. 29, 2008

(54) SOLAR CELL

(75) Inventors: Henrik Pettersson, Västra Frölunda (SE); Tadeusz Gruszecki, Partille (SE)

(73) Assignee: IVF Industriforskning Och Utveckling AB, Mölndal (SE)

( * ) Notice: Subject to any disclaimer, the term of this patent is extended or adjusted under 35 U.S.C. 154(b) by 18 days.

(21) Appl. No.: 11/103,558

(22) Filed: Apr. 12, 2005

(65) Prior Publication Data

US 2005/0177997 A1  Aug. 18, 2005

Related U.S. Application Data

(63) Continuation of application No. 10/311,147, filed as application No. PCT/SE01/01295 on Jun. 14, 2001, now abandoned.

(30) Foreign Application Priority Data

Jun. 14, 2000  (SE) .................................... 0002227

(51) Int. Cl.
    *H01L 21/00*    (2006.01)
(52) U.S. Cl. .......................... 136/263; 136/243; 438/82
(58) Field of Classification Search ................ 136/250, 136/263, 255, 256, 249, 243; 438/63, 82; 257/440, 461, 432
    See application file for complete search history.

(56) References Cited

U.S. PATENT DOCUMENTS

| | | | |
|---|---|---|---|
| 4,392,720 A | 7/1983 | Ganguillet et al. | |
| 4,761,061 A | 8/1988 | Nishiyama et al. | |
| 5,233,461 A | 8/1993 | Dornan et al. | |
| 5,593,532 A | 1/1997 | Falk et al. | |
| 5,724,187 A | 3/1998 | Varaprasad et al. | |
| 5,812,232 A | 9/1998 | Shiroto et al. | |
| 5,825,526 A | 10/1998 | Bommarito et al. | |
| 5,830,597 A | 11/1998 | Hoffmann et al. | |
| 5,985,184 A | 11/1999 | Lynam | |
| 6,291,763 B1 * | 9/2001 | Nakamura ................... | 136/256 |
| 6,310,282 B1 * | 10/2001 | Sakurai et al. .............. | 136/263 |
| 6,376,765 B1 * | 4/2002 | Wariishi et al. ............. | 136/263 |
| 6,441,299 B2 | 8/2002 | Otani et al. | |
| 6,555,741 B1 | 4/2003 | Hopkins et al. | |
| 6,652,904 B1 | 11/2003 | Phani et al. | |
| 6,657,119 B2 | 12/2003 | Lindquist et al. | |
| 6,706,963 B2 | 3/2004 | Gaudiana et al. | |
| 2003/0010378 A1 | 1/2003 | Yoda et al. | |
| 2004/0182435 A1 | 9/2004 | Pettersson et al. | |

FOREIGN PATENT DOCUMENTS

| | | |
|---|---|---|
| EP | 0 855 726 A1 | 7/1998 |
| EP | 0947876 A2 | 10/1999 |
| WO | WO 97/16838 A1 | 5/1997 |

* cited by examiner

*Primary Examiner*—Patrick Joseph Ryan
*Assistant Examiner*—Monique Wills
(74) *Attorney, Agent, or Firm*—Birch, Stewart, Kolasch & Birch, LLP

(57) ABSTRACT

Method for manufacturing sealed monolithic electrochemical systems, which method comprises the following method steps:
  application of electrolyte to a pattern of a porous structure located on a substrate, which structure constitutes a monolithic electrochemical electrode and comprises a working electrode, an insulating layer and a counterelectrode
  application of a sealing material surrounding said porous structure to form a laminate comprising a front plane consisting of said substrate and the porous structure and a rear plane consisting of the sealing material.

11 Claims, 4 Drawing Sheets

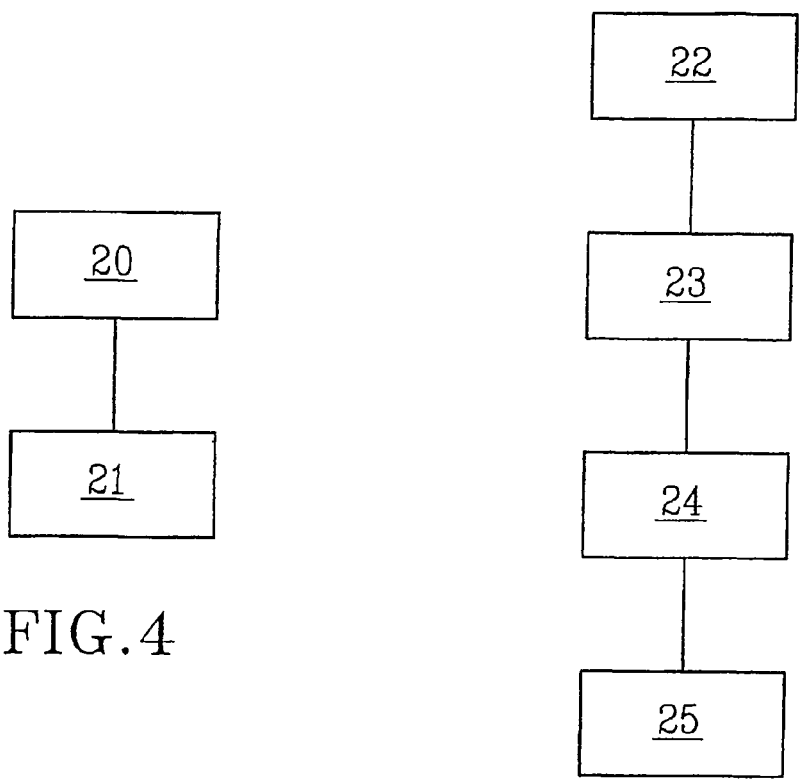
FIG.4
FIG.4a
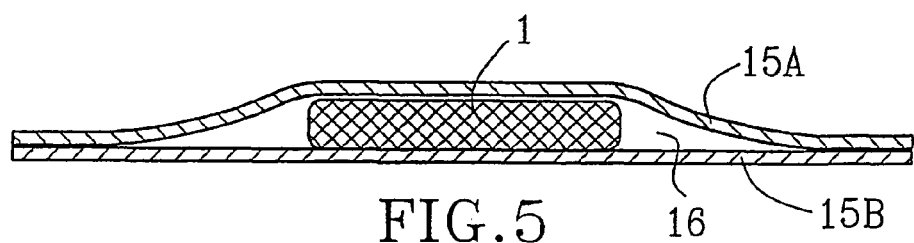
FIG.5
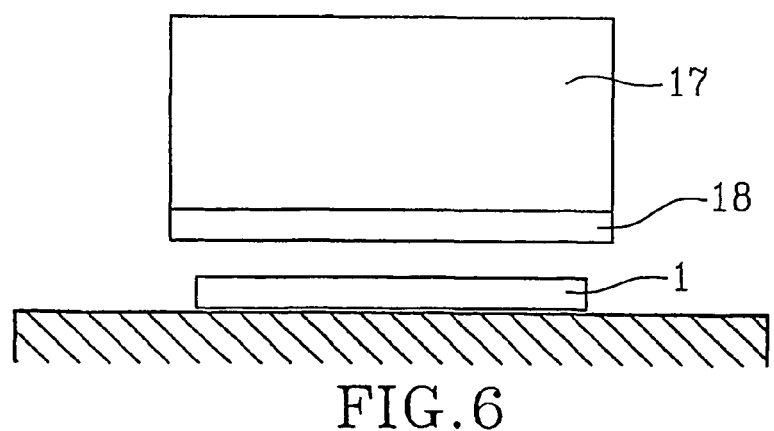
FIG.6

SOLAR CELL

This application is a continuation of application Ser. No. 10/311,147 (filing date Jul. 14, 2003) now abandoned. Application Ser. No. 10/311,147 is the U.S. national phase application of international application PCT/SE01/01295, filed Jun. 14, 2001. Priority under 35 U.S.C. §120 is claimed to both of these applications. The complete disclosure of each of these applications is incorporated by reference herein.

TECHNICAL FIELD

The present invention relates to a method for manufacturing sealed monolithic electrochemical systems according to the preamble of patent claim 11, and in particular a method for manufacturing monolithic electrochemical systems comprising a substrate, a pattern, located on this substrate, of a porous structure comprising a working electrode, an insulating layer and a counterelectrode, in which the porous structure is filled with electrolyte before the pattern of the porous structure is encapsulated between the substrate and a rear plane consisting of a sealing material.

The present invention also relates to a sealed monolithic electrochemical system according to the preamble of patent claim 1.

BACKGROUND ART

From WO97/16838, a method for manufacturing monolithic photoelectrochemical cells is previously known. In this method, photoelectrochemical cells are formed by virtue of patterns of conductive material being applied to an electrically insulated transparent material. A porous structure is then applied by successive application of a ply of a porous semiconductor, a ply of a porous insulator and a ply of a porous conductor. After application of the porous structure, the porous structure is provided with a liquid electrolyte. The porous structure is also covered by an insulating cover layer.

It has been found, however, that a number of problems arise in the sealing of monolithic electrochemical systems. On the one hand, it has been found that the cells are sensitive to moisture and impurities because the presence of moisture and impurities has a considerable effect on the long-term stability of the system. On the other hand, it is important that the sealing along the outer edge of the cells effectively prevents leakage or dissipation of, on the one hand, electrolyte from inside the cells and, on the other hand, impurities and moisture from the outside into the cells.

In order to seal monolithic electrochemical systems, in which electrolyte is in place on sealing, various methods have been tried, such as gluing and joining together by pressing between two rollers. None of the methods tried previously has resulted in electrochemical systems with sufficiently good long-term characteristics and with a sufficiently low degree of impairment of the performance of the cell in the sealing process, which has also resulted in cost-effective industrial manufacture of electrochemical systems being made more difficult.

BRIEF DESCRIPTION OF THE INVENTION

The object of the invention is to provide a method for manufacturing sealed monolithic electrochemical systems, in which the risk of the presence of moisture and impurities in the cell after sealing is reduced, the long-term stability of the cells is increased and the sealing has a high degree of impermeability in relation to the environment.

These objects are achieved by a method according to the characterizing part of patent claim 1. The sealing material comprises a plastic which is melted and joined together with a front plane, consisting of a substrate and cells located on the substrate. By virtue of the fact that the sealing material is heated and pressed together, sealing is obtained along the edge of the pattern of the porous structure. The edge means on the one hand the inner edge which separates the individual cells in a group of cells from one another and, on the other hand, the outer edge which separates a group of cells from the environment. As the plastic layer is very flexible in its heated state, very tight and good sealing is obtained, the risk of moisture and impurities penetrating being reduced and the long-term stability of the system thus being increased. The sealing method according to the invention also reduces the risk of the performance of the cells being reduced during the manufacturing process.

In a preferred embodiment of the invention, the monolithic electrochemical system is subjected to an underpressure, evacuation of moisture and gases from the porous structure being permitted. This results in the possibility of obtaining a cleaner and thus more long-term stable product.

In a preferred embodiment of the invention, the front plane and the rear plane are pressed together by a flexible pressing tool. By pressing the front plane and the rear plane together with a flexible pressing tool, good sealing is provided along the edge of the applied pattern of cells. The good sealing is provided along both an inner edge between the individual cells and an outer edge surrounding the cells. The sealing between the cells, that is to say the inner edge, results in the risk of leakage between the cells being reduced, and the sealing surrounding the pattern of cells, that is to say the outer edge, reduces the risk of dirt and moisture penetrating the cells from the environment.

Another object of the invention is to provide a sealed monolithic electrochemical system comprising an effective protective barrier against the penetration of moisture and impurities from the environment to the cells, in which the risk of degrading of the function of the cell during encapsulation is reduced, and it is possible for the cells to have sufficiently good long-term characteristics. These objects are achieved by a sealed monolithic electrochemical system according to the characterizing part of patent claim 16. By using a sealing material which comprises at least a first ply which consists of a plastic film, a joint is provided between the front plane and the rear plane of the electrochemical system, which reduces the risk of moisture penetrating the cells and also reduces the risk of electrolyte flowing out from a cell and making contact with an adjacent cell. As the plastic layer is very flexible in its heated state, very tight and good sealing is obtained, the risk of moisture penetrating being reduced and the long-term stability of the system thus being increased.

In a preferred embodiment, the sealing material comprises at least a second ply, which constitutes a barrier ply and is given suitable properties so as to block the penetration of the cell by dirt and moisture from the environment. This type of sealing material is especially suitable because the risk of impairment of the long-term stability of the system is reduced.

DESCRIPTION OF FIGURES

The invention will be described below with reference to accompanying drawing figures, in which FIG. 4 shows a flow diagram of the sealing process of the monolithic electrochemical system, FIG. 4A shows a flow diagram of a set of part processes in the sealing process shown in FIG. 4, FIG. 5 shows the pressing together of an electrochemical system by means of a flexible diaphragm, FIG. 6 shows a soft pressing head.

MODES FOR CARRYING OUT THE INVENTION

Figure 1:
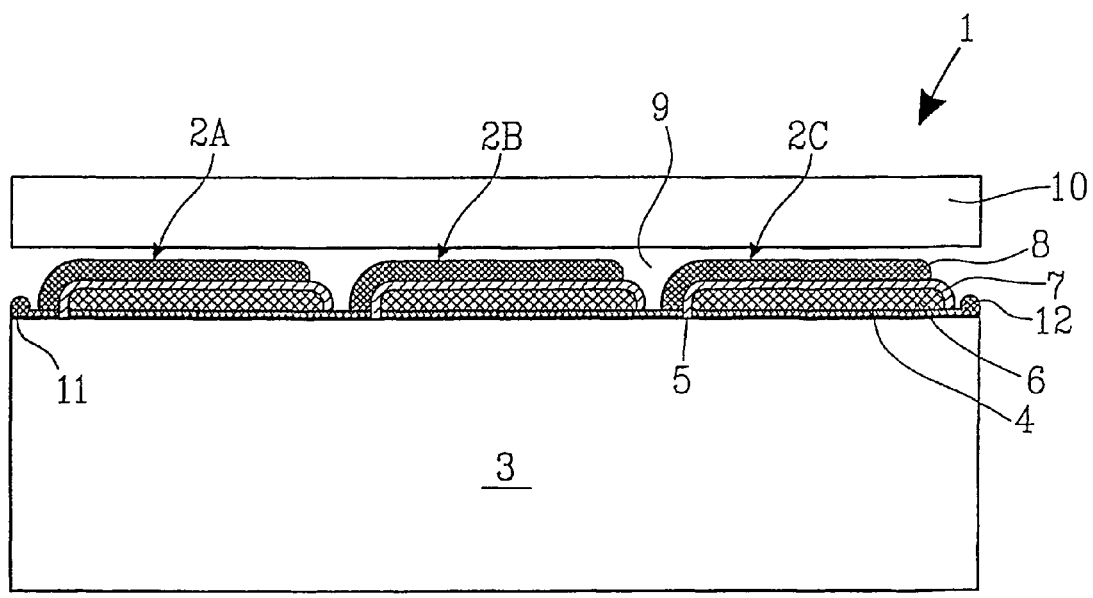
FIG. 1 shows in cross section a sealed monolithic electrochemical system comprising a number of cells.

In FIG. 1, a sealed monolithic electrochemical system 1 comprising a number of cells 2A, 2B, 2C is shown in cross section. Each cell 2A, 2B, 2C constitutes a porous structure and comprises a working electrode or photoelectrode 6, an insulating layer 7 and a counterelectrode 8. The cells 2A, 2B, 2C or the porous structures are applied to a substrate in a pattern. The pattern is surrounded by an edge which consists of an inner edge which separates the individual cells from one another and an outer edge which surrounds a group of cells which constitute said pattern. An example of such a system is described in WO 97/16838, the description of which is incorporated in its entirety in this description.

The monolithic electrochemical system 1 comprises working electrodes in the form of nanoporous photoelectrodes 6 constructed on a substrate. The substrate comprises a supporting layer 3 of completely or partly transparent material and also a thin conductive layer 4 which is applied to the supporting layer 3. The supporting layer 3 can be made of glass or plastic, in which case the photoelectric system can be designed somewhat flexibly. Each photoelectrode 6 is positioned on the thin conductive layer. The conductive layer is divided into a pattern of thin dividing lines 5 where the conductive layer is removed, a set of mutually insulated cells then being formed. The pattern preferably consists of a set of elongate rectangles, but can of course be designed in an arbitrary manner, although preferably in a surface-covering pattern. An example of a suitable pattern is shown in FIG. 2, which shows an electrochemical system 2 seen from above.

Figure 2:
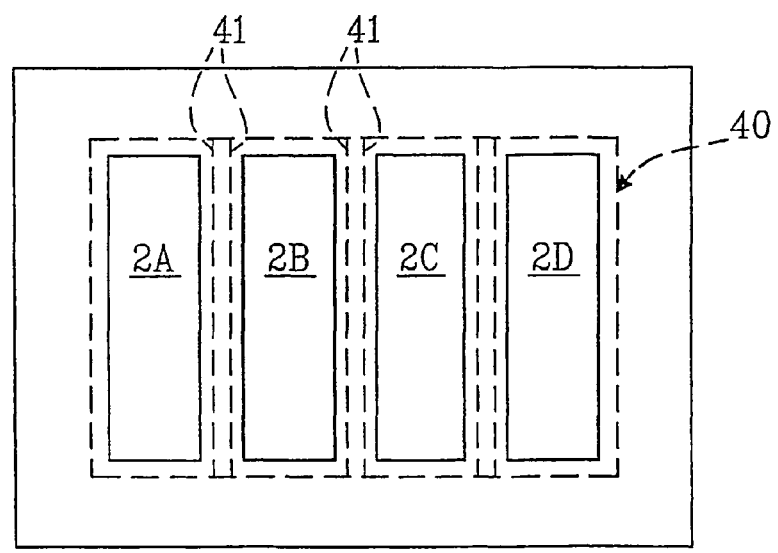
FIG. 2 shows another embodiment of a monolithic electrochemical system, in which series connection between a number of cells is effected by alternate interconnection of end walls.

According to the embodiment shown in FIG. 2, the pattern of the porous structure as a set of rectangular cells 2A-2D. The cells are positioned long side to long side. In this case, the outer edge is formed by a rectangle 40 which surrounds the set of cells and an inner edge is formed by a set of parallel lines 41 which separate the cells from one another. A group of cells is series-connected in a known manner, for example as indicated below. Other surface-covering patterns are also conceivable, for example a set of hexagons. However, the preferred embodiment with rectangles allows simple series-connection between cells. In order to bring about series-connection between cells in a simple manner, the plies of the cell are arranged in the embodiment shown in FIG. 1, where cells are interconnected side to side as follows: the photoelectrode 6 extends up to one edge of the conductive layer 4 of the cells while another edge is left free. The dividing lines 5 are designed with such a width that there is no risk of the photoelectrode coming into contact with an adjacent cell.

The photoelectrode 6 is covered by a porous ply of an insulator 7, which extends over one edge of the conductive layer and insulates the photoelectrode 6 from a porous counterelectrode 8 which is located on the insulator 7. The insulator 7 can preferably also constitute a diffuse reflector which reflects light which has passed through the photoelectrode 6 without being absorbed in it, the degree of absorption of the system being increased.

In a preferred embodiment, the counterelectrode 8 is applied in such a manner that it essentially covers the insulator 7 and extends up to that layer on an adjacent cell not covered by insulator 7. In this manner, series-connected cells are created, contacting 11, 12 having to be provided only for the first and the last in an interconnected group of cells.

The counterelectrodes 8 in the respective cells are separated by an interspace 9. It is important that the cells are insulated from one another so that electrolyte cannot leak out from the electrodes or the insulator and bring about contact between electrodes in different cells. In order to ensure that this does not occur, the interspace can be filled with an insulating material. In a preferred embodiment, this insulating material consists of parts of the sealing material 10 which is pressed into the interspace 9.

Before the electrochemical system 1 is sealed, an active substance is adsorbed, for example a light-absorbing colorant or an electrochromic material for the photoelectrode 6. Furthermore, electrolyte is supplied to the porous structure consisting of photoelectrode 6, insulator 7 and counterelectrode 8. In a preferred embodiment, the electrolyte is supplied by means of a printing process, suitably screen printing. By using this method, the correct quantity of electrolyte can be supplied, so that the porous structure in each cell is filled but does not become overfull. If too much electrolyte is supplied, there is a risk that electrolyte will run out in the interspace 9 between the cells, giving rise to a risk of short-circuiting between the cells. In another embodiment, the electrolyte is supplied by the porous structure being allowed to adsorb electrolyte during a dispensing process.

Figure 3:
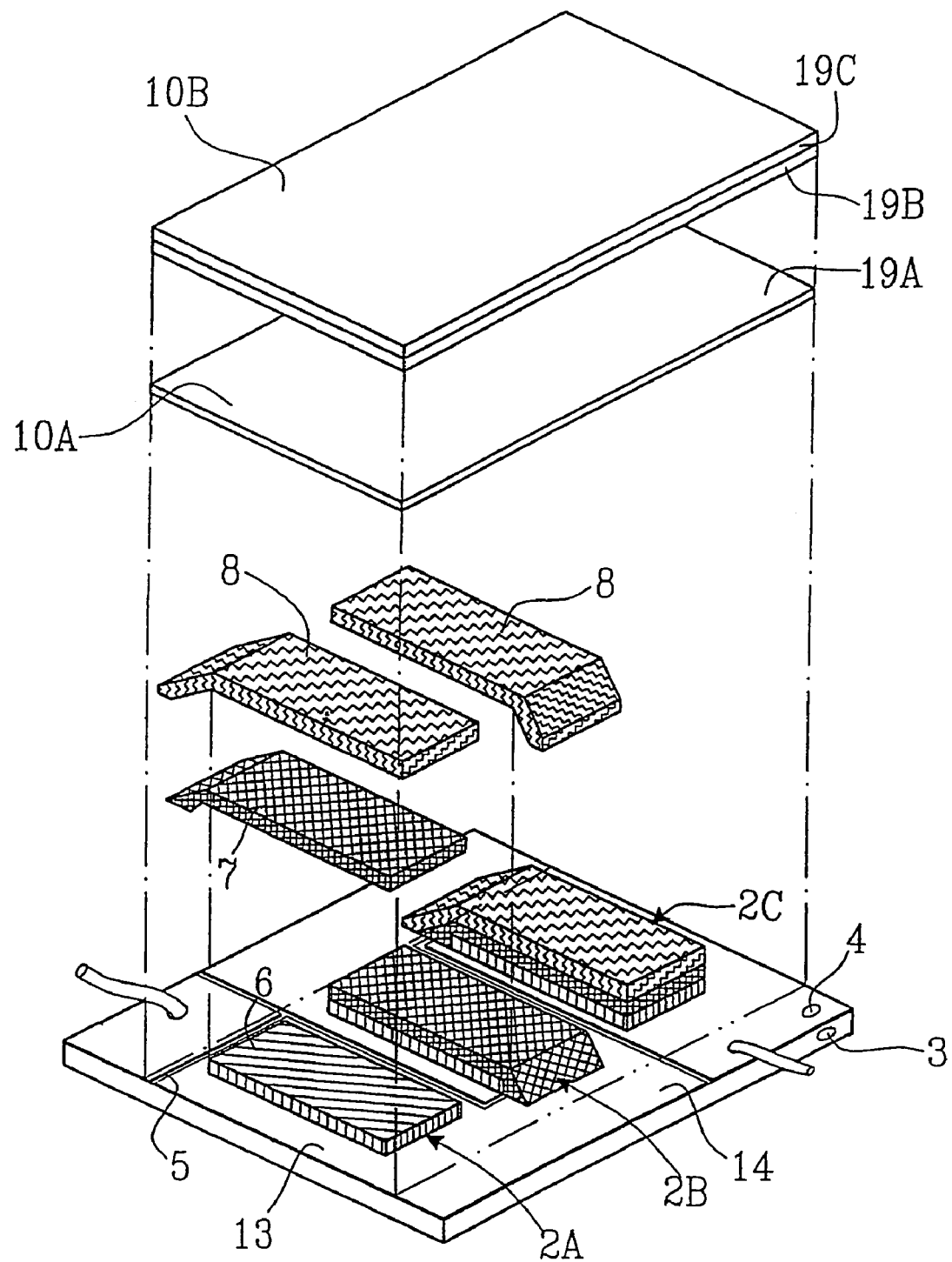
FIG. 3 shows a set of cells applied to a substrate.

In another embodiment, which is shown in FIG. 3, series-connection between a number of cells 2A, 2B and 2C is effected by end walls of the cells being connected as described below. In this embodiment, the cells are in a pattern in which each cell is rectangular and has two long sides and two end walls. The cells are formed on a substrate with a ply 4 of conductive material. The cells are insulated from one another by tracks 5 of the conductive material being etched away. Each cell comprises an anode 6 made of porous material, and in the present case this anode consists of a light-sensitive photoelectrode. An insulator 7 made of porous material is applied to the anode 6. A counterelectrode 8 made of porous material is applied to said insulator 7. In order to bring about series-connection between the cells, the cells are connected in such a manner that the anode of one cell is connected to the counterelectrode of the next cell. In the embodiment shown in FIG. 3, this is effected by the etched-away tracks 5 being designed in a zig-zag pattern, which produces an L-shaped pattern of conductive surfaces consisting of a set of Ls, having a back 13 and a foot 14, facing one another so that the protuberance from one L tends to be located directly adjacent to the next L. The photoelectrode 6 is located entirely within the back, that is to say the elongate part, of an L-shaped area. The insulator 7 is positioned so that it covers the photoelectrode and extends in slightly onto the foot 14 of the L-shaped area of an adjacent cell, that is to say the insulator 7 bridges the etched-away track 5 within an area corresponding to the width of the cell. Series-connection is effected by the counterelectrode 8 of one cell being allowed to extend into the conductive layer 4 of an adjacent cell. In the embodiment shown in FIG. 3, this is brought about by virtue of the counterelectrode 8 extending into the foot 14 of an L-shaped area of an adjacent cell. FIG. 3 also shows an encapsulating material 10A and a cover layer 10B which together constitute a sealing material 10. In a preferred embodiment, the encapsulating material 10A consists of an adhesion ply 19A, and the cover layer 10B consists of an adhesion layer 19B and a barrier layer 19C.

After the electrolyte has been supplied to the porous structure, the electrochemical system 1 is sealed by means of a sealing material 10 according to the invention using a method described below in connection with FIG. 4.

In a first method step 20, a sealing material 12 is applied to the substrate 3 in such a manner that it completely covers the cells 2A-2C and their porous structure to form a sealed monolithic photoelectric system comprising a front plane consisting of said substrate and the porous structure, and a rear plane consisting of the sealing material. The sealing material comprises at least one ply of plastic, preferably a thermoplastic such as, for example, methacrylic acid polyethylene, which is intended, on heating, to adhere to the underlying substrate and, if appropriate, the porous structure located on the substrate. In a preferred embodiment, the sealing material consists of a laminate in which an adhesion ply of plastic and a barrier ply with low or no air and liquid permeability, for example an aluminum foil. In another preferred embodiment, the sealing material comprises on the one hand an adhesion ply of plastic which is intended, as above, to bear against the substrate, and on the other hand a laminate consisting of a plastic layer and an aluminum layer where the plastic layer is intended to adhere to said adhesion ply. The plastic layer is bonded to the aluminum layer in a manner well-known to the person skilled in the art, for example by gluing. By using an intermediate ply, a good joint is brought about because the more flexible adhesion ply takes on the shape of the support more effectively then the less flexible aluminum ply.

In order to ensure that adequate tightness against liquid penetration through the edge of the adhesion ply is obtained, the adhesion ply is, in a preferred embodiment, designed with a thickness of less than 50 μm and, in a further preferred embodiment, with a thickness of less than 30 μm. With said thicknesses, a ply is obtained, which is sufficiently thin that edge throughflow does not impact negatively on the long-term stability of the enclosed cells at the same time as the thickness is sufficiently great to be easy to handle.

In a second method step 21, the sealing material is pressed together with the substrate and the cells located on the substrate. The sealing is effected by a front plane consisting of said substrate and the porous structure and a rear plane consisting of the sealing material being pressed together while subjected to heat, the adhesion ply melting together with the front plane, and sealing along the edge of the pattern being permitted. This sealing insulates the individual cells from one another along the inner edge of the pattern and thus prevents leakage of electrolyte between the cells and also insulates the group of cells which a pattern constitutes from the surrounding environment at the outer edge of the pattern and thus prevents dirt or moisture penetrating the cells. Alternative preferred embodiments of the pressing together are indicated below.

Figure 8:
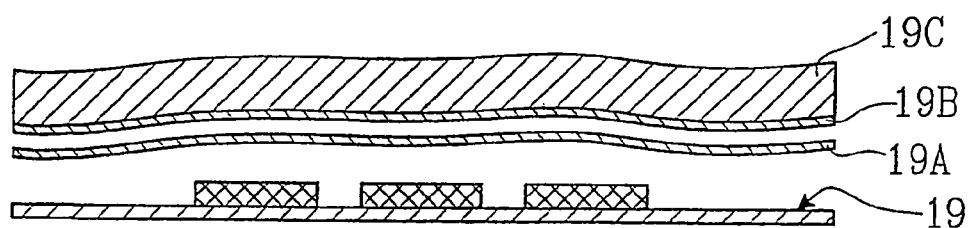
FIG. 8 shows an electrochemical system with a two-part sealing material.

Furthermore, certain preferred part processes during sealing 21 are shown symbolically in FIG. 4A. In a first part process 22, an adhesion ply of plastic is first positioned against the front plane, and thereon a laminate consisting of an adhesion ply, preferably made of plastic, and a barrier layer, preferably made of aluminum. In the event that use is made of a plastic layer and an aluminum layer, the plastic layer is bonded to the aluminum layer in a manner well-known to the person skilled in the art, for example by gluing. By using an intermediate ply, a good joint is brought about because the more flexible adhesion ply adapts to the shape of the support more effectively than the less flexible aluminum ply. FIG. 8 shows the front plane 19, the adhesion ply 19A and the barrier ply of adhesion layer 19B and barrier layer 19C. The adhesion layer 19B has the function of joining the barrier layer 19C and the adhesion ply 19A together. The adhesion ply preferably consists of a thermoplastic.

In a second part process 23, the front plane and the sealing material are subjected to an underpressure, making it possible to reduce the presence of dirt and moisture in the cells.

In a third part process 24, the front plane and the sealing material are pressed together by a flexible pressing tool, good sealing around both inner and outer edges.

Figure 9:
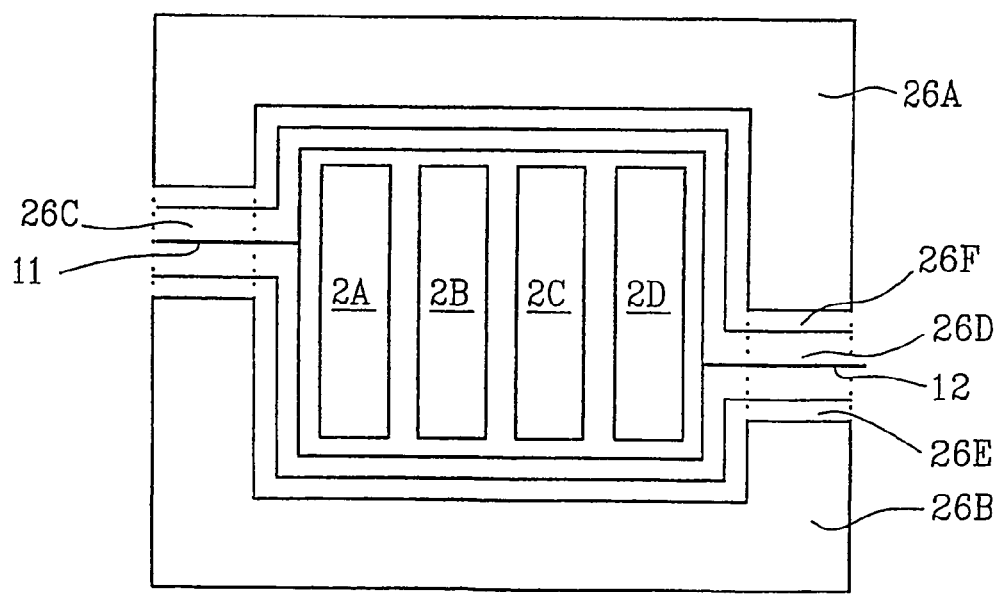
FIG. 9 shows an electrochemical system with the outer areas pressed together hard.

In order to obtain still better sealing around the outer edge, the outer edge can moreover, a little way outside the cells, for example 2-5 mm from the edge of the cells, be pressed together by a hard pressing tool in a fourth part process 25. This pressing together makes any adhesion ply 19A present thinner, the risk of penetration of dirt and moisture from the environment penetrating after joining together being reduced. FIG. 9 shows a group of cells which are pressed together by a hard pressing tool within two areas 26A and 26B essentially surrounding a grouping of cells 2A-2D. In an area 26C, 26D around each of the contacts 11, 12, the cell grouping is not pressed together in order to avoid the aluminum layer in the barrier ply being pressed together with the conductive ply on the substrate. In order to ensure that any flashover between the conductive ply and the aluminum layer in the areas 26A and 26B does not impact negatively on the cell grouping, these areas are separated by etched-away tracks 26E and 26F, the areas where hard pressing takes place being electrically insulated from the cell grouping as a whole.

The part processes indicated above can be combined individually to obtain separate preferred embodiments of the invention.

Figure 7:
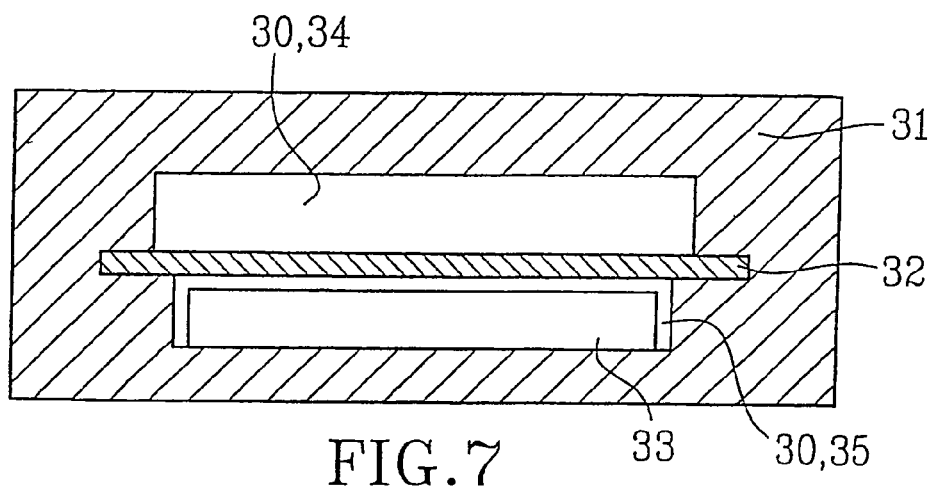
FIG. 7 shows a two-chamber system for pressing an electrochemical system together.

In a preferred embodiment, the pressing together is carried out by a flexible pressing tool. A flexible pressing tool means that the pressing tool is allowed to be deformed sufficiently to allow the pressing tool to be deformed for access into the interspaces between the cells, the sealing material being pressed in against the front plane so that the sealing material is pressed against the cells and down into the interspaces between the cells and also around the edges of the pattern. FIGS. 5, 6 and 7 show examples of embodiments of flexible pressing tools.

FIG. 5 shows the pressing together of a monolithic photoelectric system by means of a flexible diaphragm 15A. The electrochemical system 1 is placed on a support 15B, after which it is covered by the flexible diaphragm 15A. The flexible diaphragm can suitably be made of rubber. The electrochemical system is then subjected to pressure via the diaphragm 15A, and heat is supplied, sealing being effected. In a preferred embodiment, the pressure on the diaphragm 15A is brought about by the space 16 around the electrochemical system 1 being subjected to an underpressure. This underpressure reduces the presence of moisture and impurities in the cells before sealing takes place, the quality of the cells being improved. The support 15B can also be designed as a flexible diaphragm.

In a preferred embodiment, the pressing together takes place under pressure which is obtained from flexible diaphragms which surround the monolithic electrochemical system. By making use of a flexible diaphragm, a uniform pressure is obtained over the entire monolithic electrochemical system and good sealing is obtained in the abovementioned interspaces 9 between the cells.

In a preferred embodiment, the pressure is obtained by virtue of the monolithic electrochemical system being placed in a pocket between two flexible diaphragms and said pocket being subjected to an underpressure, the pressure of the environment pressing the monolithic electrochemical system together. This underpressure also contributes to reducing moisture and the presence of dirt in the porous structure before sealing finally takes place.

FIG. 6 shows an alternative embodiment where the pressing together is effected by a pressing head 17 comprising a pressing surface 18 made of soft material, for example rubber, pressing together of the sealing material and the front plane being permitted so that the sealing material is pressed against the cells and down into the interspaces between the cells and also around the edges of the pattern. According to a preferred embodiment, this type of pressing can take place in a chamber subjected to an underpressure, making it possible to reduce the presence of dirt and moisture in the finished product.

In an illustrative embodiment, the monolithic electrochemical system is placed in a heating furnace which heats the monolithic electrochemical system to roughly 100° C., heating from room temperature taking place over roughly 30 minutes. The material is then cooled slowly.

According to an alternative method, the electrochemical system is sealed by the front plane and the sealing material being placed in a chamber which is subjected to an underpressure. According to a preferred embodiment, in order to permit the evacuation to reduce further the presence of dirt and moisture, the front plane and the sealing material are separated by a gap for a period of time while subjected to the underpressure.

When the front plane and the sealing material have reached the correct temperature, the front plane is pressed together with the sealing material.

In an embodiment of the invention, the pressing together is carried out by using a two-part chamber as shown in FIG. 7. The chamber 30 is formed in a housing 31 and comprises a first and a second part chamber 34, 35 separated by a flexible diaphragm 32. The electrochemical system 33 to be joined together is placed in one of the part chambers. An air pump (not shown) is or can be connected to the comb so as to make evacuation of both the first and the second part chamber possible. To this end, the housing 31 can be provided with a communication duct between the first and the second chamber, the communication duct comprising a check valve positioned so that evacuation of the first and second chamber can be effected jointly, but air does not flow from the second to the first chamber when air is subsequently introduced in order to allow pressing together of the front plane and the sealing material of the electrochemical system.

The invention is not limited to the embodiments described above but can be varied within the scope of the patent claims below. For example, the electrochemical system can consist of a photoelectrochemical system, that is to say a solar cell, or a display in which elements constitute, for example, letter segments. In an embodiment, it is conceivable to encapsulate a display alongside a solar cell. In this case, different electrolytes will be used for the display and the solar cell, which are encapsulated simultaneously. Furthermore, both rear plane and front plane can comprise additional plies; for example, a colored layer can be located between the adhesion ply 19A and the adhesion layer 19B in order to give the product a desired appearance, or alternatively these or other layers forming part of the product can be colored.

The invention claimed is:

1. A sealed monolithic solar cell system comprising: a pattern of a porous structure located on a substrate,
   wherein said structure constitutes at least one monolithic electrochemical cell and comprises a photo electrode, an insulating layer, and a counterelectrode, and an electrolyte applied to said pattern of the porous structure and absorbed in said porous structure for forming at least one solar cell,
   wherein a photosensitive dye is disposed on the photo electrode of the porous structure,
   wherein a sealing material surrounds said porous structure to form at least one sealed monolithic solar cell photoelectrochemical system comprising a front plane consisting of said substrate and the porous structure and a rear plane consisting of the sealing material, and
   wherein said front plane and rear plane are heated and pressed together and sealed along an edge of the pattern of the porous structure by virtue of a plastic layer forming part of the sealing material being melted and joined together with said front plane.

2. A sealed monolithic solar cell system comprising
   a substrate supporting a pattern located on said substrate of a porous structure which comprises a photo electrode, an insulating layer, and a counterelectrode,
   electrolyte applied to said pattern of the porous structure and absorbed in said porous structure for forming at least one solar cell, and
   contacts for said photo electrode and said counterelectrode for interconnection with at least one electric circuit,
   wherein a photosensitive dye is disposed on the photo electrode of the porous structure,
   wherein a sealing material is located on said substrate and covers said porous structure, said sealing material comprising an adhesion ply of plastic which is applied to said substrate and porous structure and a laminate comprising at least an adhesion layer and a barrier layer in which the adhesion layer is placed over said adhesion ply and
   wherein said substrate, porous structure, and sealing material are joined together to form a sealed monolithic solar cell by melting the substrate, the adhesion ply, and the adhesion layer together.

3. The sealed monolithic solar cell system of claim 1, wherein said structure constitutes a plurality of electrochemical cells connected in series.

4. The sealed monolithic solar cell system of claim 2, wherein said structure constitutes a plurality of electrochemical cells connected in series.

5. The sealed monolithic solar cell system of claim 1, wherein said electrolyte is applied by a printing process.

6. The sealed monolithic solar cell system of claim 2, wherein said electrolyte is applied by a printing process.

7. The sealed monolithic solar cell system of claim 1, wherein sealing is provided along an outer edge surrounding said pattern of a porous structure and an inner edge separating individual solar cells.

8. The sealed monolithic solar cell system of claim 2, wherein sealing is provided along an outer edge surrounding said pattern of a porous structure and an inner edge separating individual solar cells.

9. The sealed monolithic solar cell system of claim 1, wherein the porous structure in each cell is filled with electrolyte.

10. The sealed monolithic solar cell system of claim 2, wherein the porous structure in each cell is filled with electrolyte.

11. A method for manufacturing a sealed monolithic solar cell system, which method comprises the following steps:

applying electrolyte to a pattern of a porous structure located on a substrate by a printing process, wherein the structure constitutes at least one monolithic electrochemical cell and comprises a photo electrode, an insulating layer, and a counterelectrode, said electrolyte being absorbed in said porous structure for forming at least one solar cell, applying a sealing material surrounding said porous structure to form at least one sealed monolithic solar cell photoelectrochemical system comprising a front plane consisting of said substrate and the porous structure and a rear plane consisting of the sealing material, and heating and pressing together said front plane and rear plane to create a seal along an edge of the pattern of the porous structure by a plastic layer forming part of the sealing material melting and joining together with said front plane.

\* \* \* \* \*